(12) United States Patent
Zante

(10) Patent No.: US 8,881,484 B2
(45) Date of Patent: Nov. 11, 2014

(54) LONG SPAN SOLAR COLLECTOR SUPPORT SYSTEM

(76) Inventor: Anthony Zante, Fremont, CA (US)

( * ) Notice: Subject to any disclaimer, the term of this patent is extended or adjusted under 35 U.S.C. 154(b) by 0 days.

(21) Appl. No.: 13/108,746

(22) Filed: May 16, 2011

(65) Prior Publication Data

US 2012/0291374 A1 Nov. 22, 2012

(51) Int. Cl.
*E04B 1/32* (2006.01)
*F24J 2/52* (2006.01)
*F24J 2/46* (2006.01)

(52) U.S. Cl.
CPC ............. *F24J 2/5232* (2013.01); *F24J 2/5245* (2013.01); *F24J 2/526* (2013.01); *F24J 2/5264* (2013.01); *F24J 2002/4663* (2013.01); *F24J 2002/5215* (2013.01); *F24J 2002/5226* (2013.01); *Y02B 10/20* (2013.01); *Y02E 10/47* (2013.01)
USPC ........................................... 52/641; 52/173.3

(58) Field of Classification Search
USPC .................... 52/641, 646, 173.3, 632, 645
See application file for complete search history.

(56) References Cited

U.S. PATENT DOCUMENTS

| | | | | |
|---|---|---|---|---|
| 3,028,706 A * | 4/1962 | Falconer | ........................... | 52/66 |
| 3,693,643 A * | 9/1972 | Weber | ............................. | 135/26 |
| 3,860,022 A * | 1/1975 | Arndt et al. | ..................... | 135/98 |
| 4,187,123 A * | 2/1980 | Diggs | ............................ | 136/206 |
| 4,819,399 A * | 4/1989 | Onoda | ............................ | 52/646 |
| 4,995,377 A * | 2/1991 | Eiden | ............................ | 126/605 |
| 5,016,403 A * | 5/1991 | Fujita | .................................. | 52/7 |
| 5,172,711 A * | 12/1992 | Mueller et al. | .................. | 135/16 |
| 5,228,258 A * | 7/1993 | Onoda et al. | .................... | 52/646 |
| 5,730,117 A * | 3/1998 | Berger | ........................... | 126/604 |
| 6,058,930 A * | 5/2000 | Shingleton | ..................... | 126/600 |
| 6,152,157 A * | 11/2000 | Jang | ............................. | 135/131 |
| 6,930,237 B2 * | 8/2005 | Mattiuzzo | ...................... | 136/251 |
| 7,644,721 B2 * | 1/2010 | Hoberman et al. | ............ | 135/144 |
| 7,705,277 B2 * | 4/2010 | Noble et al. | ................ | 250/203.4 |
| 2001/0036024 A1 * | 11/2001 | Wood | ............................ | 359/853 |
| 2009/0256046 A1 * | 10/2009 | Hausner et al. | ............... | 248/398 |
| 2010/0269446 A1 * | 10/2010 | Merrifield | ....................... | 52/646 |
| 2011/0114153 A1 * | 5/2011 | Almy et al. | .................... | 136/246 |
| 2011/0120524 A1 * | 5/2011 | Wares et al. | .................. | 136/246 |

* cited by examiner

*Primary Examiner* — Basil Katcheves
(74) *Attorney, Agent, or Firm* — GSS Law Group

(57) ABSTRACT

A long span solar collector mounting system with a deployable truss structure centered beneath the beam, and a single centered vertical support and a stabilizing end support, for mounting solar panels and other equipment on roofs and other surfaces, that can be tilted to a desired angle with respect to the ground, and can be rotated about its vertical axis to maximize solar production, with a vertical member that is offset to direct resultant wind loads directly through the base thereby minimizing twisting or bending stresses on roof structures, with beam clamping capability for attaching to roof beams below the roof with only access above the roof, that can be tilted during and after installation for reroofing and servicing access, with angled retaining nuts that provide secure attachment of solar panels and other equipment.

1 Claim, 9 Drawing Sheets

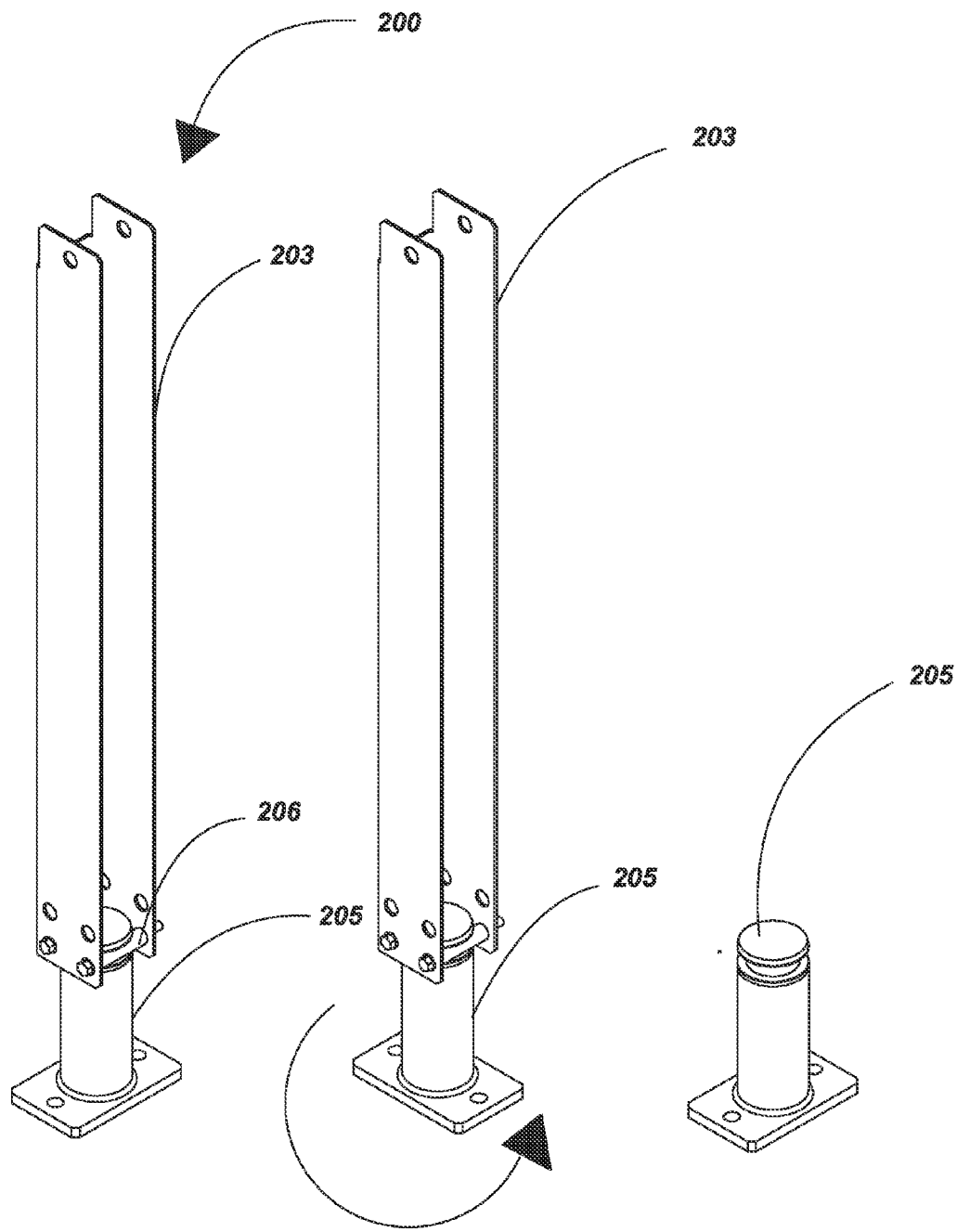
FIG. 5A   FIG. 5B   FIG. 5C

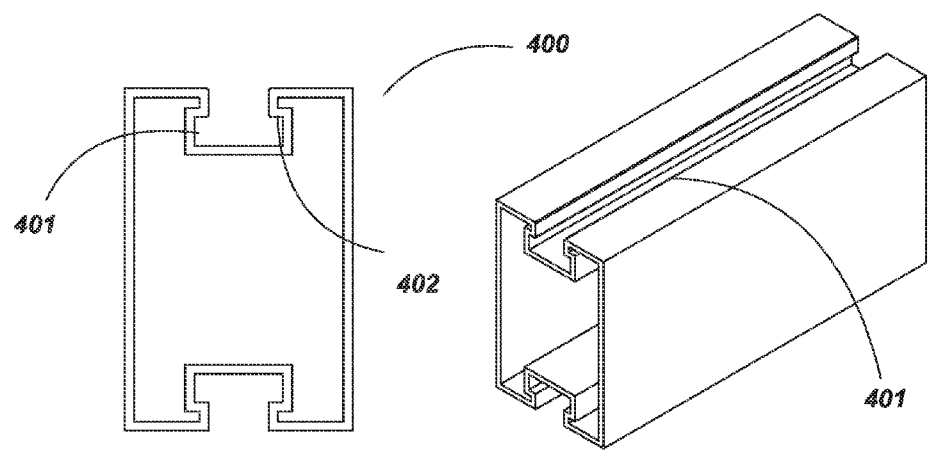
FIG. 8
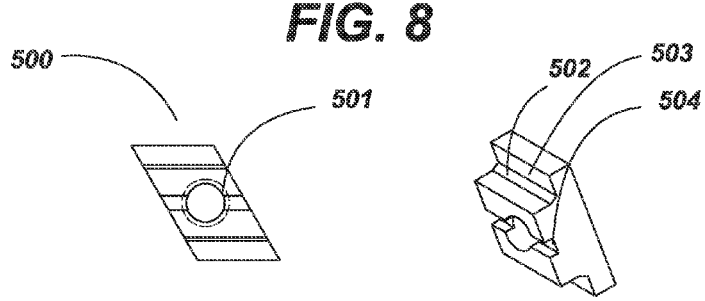
FIG. 9
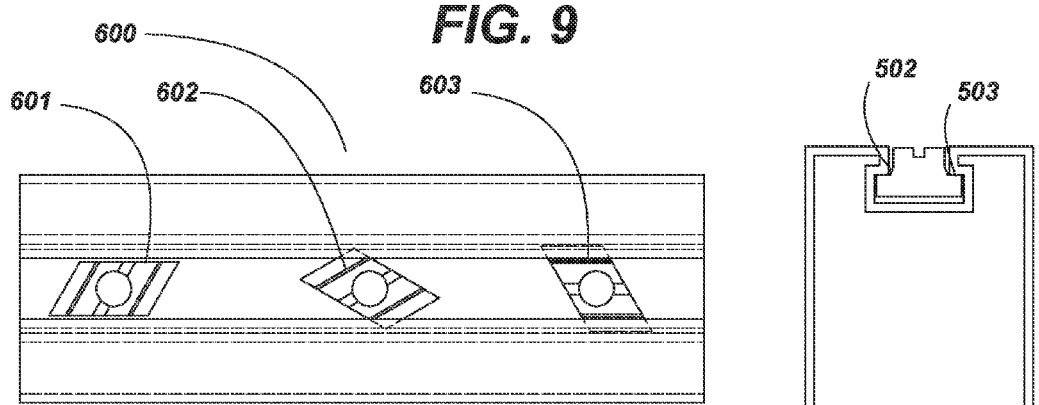
Fig. 10
FIG. 10A

LONG SPAN SOLAR COLLECTOR SUPPORT SYSTEM

CROSS-REFERENCE TO RELATED APPLICATIONS

None

BACKGROUND OF THE INVENTION

1. Field of Invention

This invention relates to a roof mounted solar collector support system with a central post and truss structure with long span capacity that substantially reduces the required roof connections, that is easily deployed to a desired angle of inclination and subsequently tilted to provide access for roofing and other servicing. This field deployable structure has as its main structural elements the employment of a single central support and truss elements that substantially reduce beam bending stress and deflection from applied loads. This long span beam system configuration with its offset central post substantially reduces bending loads that are imparted to the roof due to wind. This invention allows attachment directly to major beam supports below the roof, while only requiring access from above.

2. Prior Art

For many years structural beams have been used to support solar panels as well as other equipment in arrays of various sizes and shapes. The larger or longer span arrays require taller and stiffer structures to withstand the loads and resultant stresses. There have been a number of structures that have become widely used for solar panel applications including the 'strut' family of U shaped or double U shaped rolled steel or extruded aluminum structures. In all instances these strut structures have a uniform shape throughout their length. They are often simply supported at or near each end and subject to uniform loading along their length causing excessive bending stresses as the distance from the supports increased. Typically the maximum practical length for roof mounted solar panel support structures has been 4 to 12 feet. Longer spans have been provided but have required increasingly stiffer and more costly structures.

More recently other more unique special shapes have become popular including those that reduce the installation labor required. For commercial applications requiring larger arrays it has become increasingly important to have longer spans that require less anchored support posts to reduce costs for both roof mounted as well as ground mounted systems. However very few commercially available support structures exist that provide long span capability due to the cost of these higher profile structures. And few inroads have been made in devising easily deployed truss-like structures for solar mounting applications.

Some work has been done over the years to develop cost-effective field deployable truss structures for long span applications. Ignash, U.S. Pat. No. 6,321,521, developed a collapsible 3 sided truss structure that allows the three framework sections to be folded together to form the truss beam. Nygren, U.S. Pat. No. 6,076,770, developed an inwardly foldable truss to reduce space for shipment. Merrifield, U.S. Pat. No. 7,028,442, developed a linearly expandable truss structure that allowed variable length structures. And Beltz, U.S. Pat. No. 4,546,591, developed a truss structure with removable pins to allow the structure to be collapsed.

All of the commercially available support struts suffer from a number of disadvantages. For simply supported structures with uniform loads applied throughout their length, maximum bending stress occurs in the center of the beam. Because a beam that is extruded or roll formed has a uniform shape, it will be significantly heavier overall than one that can be varied to have maximum stiffness only where needed. For this reason a continuous profile is relatively heavy as a long span support and therefore not cost-efficient due to its weight to stiffness ratio. This relatively higher weight is also not desirable for rooftop installations where lifting equipment is limited.

Generally the mass of a beam will increase at a faster rate than the rate of increase of the span in order to maintain consistent beam support. For example, if the solar panel support span is doubled in length, the corresponding beam weight will increase by a factor of approximately 3. This is why continuous profile structures have not been economical solutions for large spans. For this reason conventional beams must be supported at relatively closer spacing leading to more supports required.

It is general knowledge that many simply supported structures such as bridges are constructed in a truss shape that concentrates more structural material in the center of the span to withstand the peak moment and prevent excessive stress and sag in the middle of the structure. However this type of structure is difficult to incorporate into cost-competitive products for solar panel support. Efforts to utilize truss structures for supporting PV systems as well as for supporting other equipment have seen only limited use. In most cases the additional field construction labor cost to erect the truss structure has negated their value. Field installation labor costs for truss structures have in some instances far exceeded the cost of the entire truss structure.

Prefabricated truss structures have also been used for solar panel support as well as for supporting other equipment. In these cases the field construction costs are virtually eliminated. However three dimensional prefabricated strut structures are significantly more expensive to build, ship, and stage on a job site. Additionally the expense of bringing these expanded structures to the roof of a building also creates a significant expense. The patent examples described above all have the ability to be folded or collapsed for minimizing shipping space and being deployed once it is delivered on site. However, most expandable structures are comprised of a multitude of components that make them expensive to manufacture—particularly for long span applications.

Another problem associated with long span structures is that they create significantly higher concentrated loads at each connection to the roof. First of all, the lift loads on solar panels in accordance with ASCE structural calculations may be 25 pounds per square foot or higher. This may cause concentrated loads of thousands of pounds at each roof connection point. Furthermore because of the tilted angle required for solar panels this wind load causes a considerable side loading which in turn creates a twisting or bending load at the roof connection point. These factors limit the applicability of long span structures with conventional connection methods. In order to withstand these high loads it is necessary to attach to major structures within buildings. This has not been a simple task since many of the major beam structures in buildings are typically well below the roof surface and therefore difficult to access without going inside the building to secure the connections.

Thus there have been few cost-effective solutions for long span support of solar and other equipment on rooftops and for ground mounting in the 12 feet and greater length range. They typically consisted of either large, massive support beams, or some form of truss structure that was expensive to build, ship and deploy in the field. And solutions have been even more evasive because of the structural and access difficulties associated with high load connections.

In summary, all of the prior art for long span beam support structures suffer the disadvantages noted above including the following:
1. Continuous beam profiles for long spans are expensive due to the cost of the material.
2. Continuous beam profiles are difficult to handle and install because of their resultant excessive weight.
3. Prefabricated truss structures are expensive to build, ship, and install because of their size.
4. The currently available deployable truss structures are complicated, expensive, and require considerable labor to erect in the field.
5. Difficulty of attachment limits the cost-effectiveness and usefulness of currently available long span structures The above mentioned disadvantages provide a general background with the prior art devices. The present invention does not suffer the disadvantages noted above but the above discussion provides a way of comparing it with prior art.

In summary there is a need for long span support systems for solar panels that are easily deployable.

OBJECTS AND ADVANTAGES

The main feature of this deployable truss structure is its centralized pedestal based support structure with bottom chords that form a wide V-shape below the main beam. This V-shaped structure is configured to preferentially direct the resultant wind load toward the base of the support to substantially reduce the twist or bending moment applied to the roof structure or ground mount independent of the tilt angle. And because of this centrally balanced load it allows a single point of support to the roof or ground even for relatively long spans. This is particularly important for installers as well as owners since it substantially reduces the number of penetrations. Typically there is an average of approximately one roof penetration for each solar module. With this type of centrally supported structure it is possible to have only one penetration for 5 to 10 or more modules. This substantially reduces one of the major costs of roof mounted solar arrays. In addition, the possibility of roof leaks is substantially reduced when there are substantially less penetrations.

It is also important for steel buildings that have large distances between the main beams. Since this long span is center pedestal mounted instead of end mounted, it is not necessary to span the full distance between major building beams to support the long span structure. In some cases the major support beams in roof structures may be up to 60 feet apart making it virtually impossible to support long span beams from their ends unless they are of similar length. And long span support structures that of this length are not cost-effective solutions because of the high profile associated with structures of this length.

One of the most important advantages of this invention is its ability to substantially reduce any twist, or bending moment, normally imparted to the roof structure by wind loads. This is particularly important for steel buildings roofs where the long spans supports will be attached to the main steel beam support structures. Most steel beam structures supporting roofs are wide flange type beams which are unable to withstand significant twist loads. It is only by substantially reducing major twist of these beams are we able to successfully attach to them.

The major force exerted on the structure, and therefore the roof, is the wind load lift normal to the solar panel surfaces. This load is typically 25 pounds per square foot or higher, which is considerably larger than the downward forces due principally to gravity. Typically the panels are tilted at an angle towards the sun for improved solar performance. This causes the resultant wind load normal to its surface to be at a non-vertical angle. The horizontal component of this load creates a bending moment on the solar panel support structure that is attached to the roof. This force in turn, transfers the bending moment to the roof structure. This bending moment is dependent on the distance that the resultant wind load is from the central mounting point on the roof beam. And as the tilt angle of the panel array increases, the bending moment increases. Also as the beam structure central support increases in height, causing the resultant load vector to be farther from the attachment point, the resultant bending moment likewise increases.

The geometry of this long span beam structure, by its design, offsets the central support position of the central vertical member. Its central support position, due to its vertical orientation in an otherwise tilted truss structure causes the solar array to be offset from center. This offset results in the wind load force, which is in a direction normal to the tilted array, being directed much closer to the base mounting position. And as the array is tilted further from the horizontal position it offsets the center of the array even further from center, which redirects the resultant wind load once again closer to the mounting base position. This in turn reduces any bending load associated with the wind load. This substantially reduces the bending moment and resultant stresses normally imparted to the existing roof support structures, thereby eliminating any roof reinforcement that would otherwise be required.

Another advantage of this long span beam structure is its relatively light weight. The main beam is centrally supported with a single vertical support, and two lower cords that create a V-shape. The wind load lift, which is the major force exerted on the structure, causes the lower cords of the truss to be in tension. The lower force downward load causes the lower chords being in compression. The lower chords are able to withstand higher loads in tension than in compression because of buckling. Therefore the lower chords can be relatively lighter for a centrally supported structure such this than for an end mounted structure. This allows the lower cords to be significantly smaller, lowering the weight of the long span.

Another important advantage of this structure is its adjustable tilt capability. This is an important advantage because the angle of inclination can be changed without having to change components which is normally required for most solar array support structures—it merely changes the connection locations of the lower cords to the main beam.

Another important advantage of the centrally supported structure is its ability to be tilted after installation. This is very important for maintenance of the roof and particularly important for reroofing a building. Normally the solar array must be removed in order to reroof a building which requires considerable time and expense the loss of power during this process. With this centrally supported structure the solar array can be tilted away from the roof and secured in place during roof servicing.

Another important advantage of this invention is its ability to be attached to major beam structures below the roof without needing access inside the building. With this invention access holes for beam attachment can be drilled from the roof and the beam clamping feature is employed to clamp to the beam with no requirement to drill into said beam. This substantially reduces assembly time and resultant cost.

In summary, there are many advantages of this centrally supported long span beam structure compared to the prior art including the following:

- Substantially lowers the number of mounts or penetrations required for mounting solar arrays on roofs and other surfaces.
- Central support allows a lighter weight truss structure
- Pedestal mounting allows mounting to a single roof beam without the need to span between major support beams that may that have large distances between them
- Offsetting load design substantially reduces bending moments applied to roof structures
- Provides ability to tilt array for reroofing access without removing solar panels
- Beam clamp attachment capability substantially reduces installation costs for steel beam buildings.

In the first aspect of this invention it is configured in a truss structure that is centrally supported in the middle of the span. This truss structure has a deep mid-section tapering to a simple beam profile at each end. This truss structure consists of a top chord, or beam, that provides the contact support for a solar array or other large area device. Under this top chord are at least two lower chords connecting to the top chord on each side to form a V shape with the vertex formed directly below the top chord. Preferably a vertical member is used to join the mid section of the upper chord to the lower chords at their vertex and provide connection to a base. As in any formed truss structure this configuration provides substantially higher load capacity than the top chord could provide without the chord truss elements.

Upon applying a load due principally to gravity, the top chord will be mainly in tension while the lower chords will react in compression as generally defined by vector analyses for this type of structure. However, in solar arrays, typically the highest calculated load is due to wind rather than gravity. The maximum thrust of this force is typically upward, normal to the angle of the solar array surface, and the resultant load vector is centered at the mid-point of the array surface. This greater upward force creates tension loads in the lower chords that are significantly higher than the gravity induced compression loads. This preferred embodiment can therefore withstand considerably higher lift loads than would be the case if the lower chords were in compression. Alternatively, if the above described beam truss structure was supported on each end instead of at its center, its load capacity would be much lower. This is due mainly to the lower chords having a reduced capacity in compression due to buckling. Therefore the preferred embodiment with a central support instead of end supports allows significantly increased load capacity.

In a second aspect of this invention, the center vertical support connects to the top chord or main support beam at an offset position relative to said top chord centerline. The offset distance from center is closely related to the tilt angle of the solar array. So as the tilt angle increases, the position at which the vertical connects to the top chord is further offset from centerline. This has an important impact on the position of the wind load resultant force vector. The effect of this offset is that the resultant wind load vector passes very close to the base mounting position. This substantially reduces the bending moment applied to the roof structure. Thus this long span system is designed so that as the angle of inclination of the solar array is varied, the offset of the mounting array centerline shifts to maintain a substantially reduced bending moment at the base of the mounting structure thereby lowering the bending stress on the roof.

In a third aspect of this invention, the vertical member of the long span beam has a removable pin in the base of the vertical support which when removed allows said beam to be rotated to the horizontal position. Once rotated a locking bolt holds the assembly temporarily in this position while assembly takes place. After assembly of the array on two of the long span beams, this segment of the overall array can be rotated back into position by removing the locking bolt and inserting the removed pin. At a later date when there is a need for reroofing this procedure can be repeated so that the array does not have to be removed during this reroofing process.

In a fourth aspect of this invention, a beam clamp is deployed from above the roof that clamps to a main roof beam member such as a wide flange beam below the roof without requiring access inside the building. A hole drilled through the roof allows deployment of the beam clamp and secure attachment to the roof beam below. The beam clamp is designed to minimize bending stress on the beam below. This is accomplished with the use of a central support tube or pipe that provides the reacting compression force against the top of the wide flange beam as tension is applied to the clamp jaws pulling them against the underside of the wide flange top flange. The close proximity of the beam clamp compression and tension components on the flange insures little bending stress to the top of the wide flange beam that for which this clamp is typically used. A single clamping screw is used for both attachment and securing the clamp to the wide flange beam structure below.

In a fifth aspect of this invention a connector allows secure connection between the long span beam and other components including beam cross-members. It is composed of a slanted nut that slides within the nut slots in the long span beam and cross-members. The slanted nut is cut at a 60 degree angle instead of 90 degrees to allow insertion and rotation into the T-slot. Once rotated clockwise 60 degrees to its stopping point in the long span or cross-members, it acts as a retained nut that allows component attachment. The slanted nut has a taper in the base that prevents the nut from rotating counter-clockwise and loosening once engaged. A T-clip when used in conjunction with the slanted nut can be used to securely join the long span beam and cross-members together. This is done with an intentionally shortened T-clip relative to the distance between the two strut slots creating an interference fit. The T-clip T section is positioned into one of the T-slots and angled to insert into the other T-slot. Once tightened the T-clip creates an interference fit between the long span and cross-member creating a tight fit for secure connection.

SUMMARY

In accordance with the present invention comprises a centrally supported long span beam system for supporting and tilting solar arrays to an inclined angle with a truss structure base that is comprised of a main top chord that will be under tension from downward loads or compression from upward loads, at least two lower chord beams that form a V shape, that will be under compression for upward loads and tension for downward loads, and a vertical member, connecting the upper and lower chords together that can be offset from center to reduce bending and twisting on its base and roof structure to which it is attached. The invention further comprises a beam clamping method to attach to roof beams below the roof that can be fully deployed from above the roof. Beam connection components include a secure method of attachment with angled retaining nuts that cannot loosen after tightening for secure attachment of components to said long span beam.

BRIEF DESCRIPTION OF THE DRAWINGS

FIG. 5A shows a perspective view of a vertical member and base support in the operating position FIG. 5B shows a perspective view of said vertical member and base support with the base support rotated FIG. 5C shows a perspective view of said base support FIG. 8 shows a section view and a perspective view of a beam with a T-slot FIG. 9 shows a front view and perspective view of an angled retaining nut FIG. 10 shows a view of said beam and retaining nut in an assembly sequence FIG. 10A shows an end view of said beam and retaining nut in the assembled position

Figure 1:
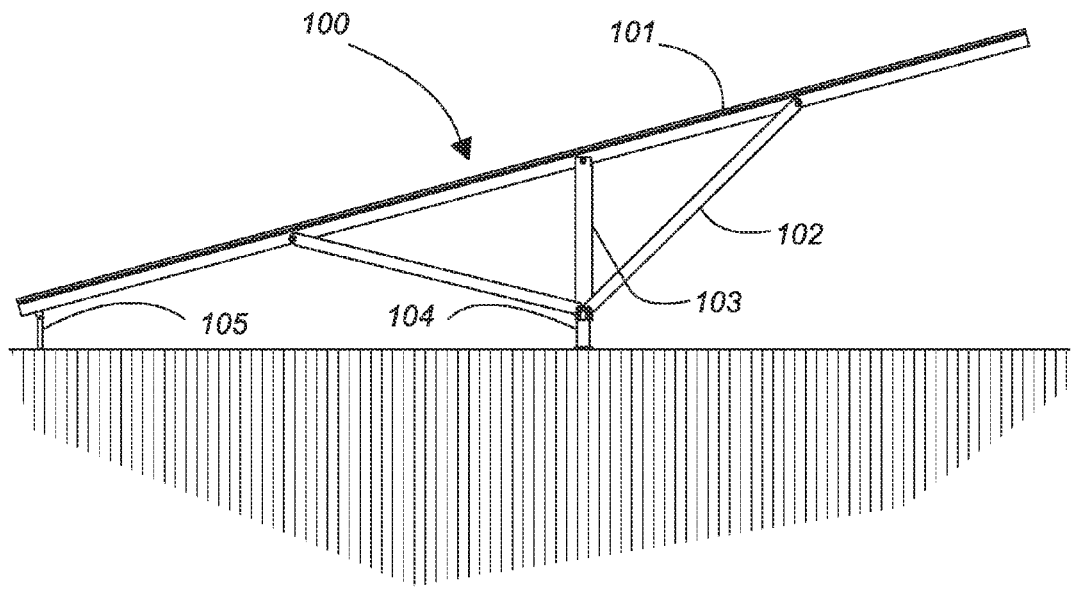
FIG. 1 shows a view of a long span beam in the assembled position
Figure 2:
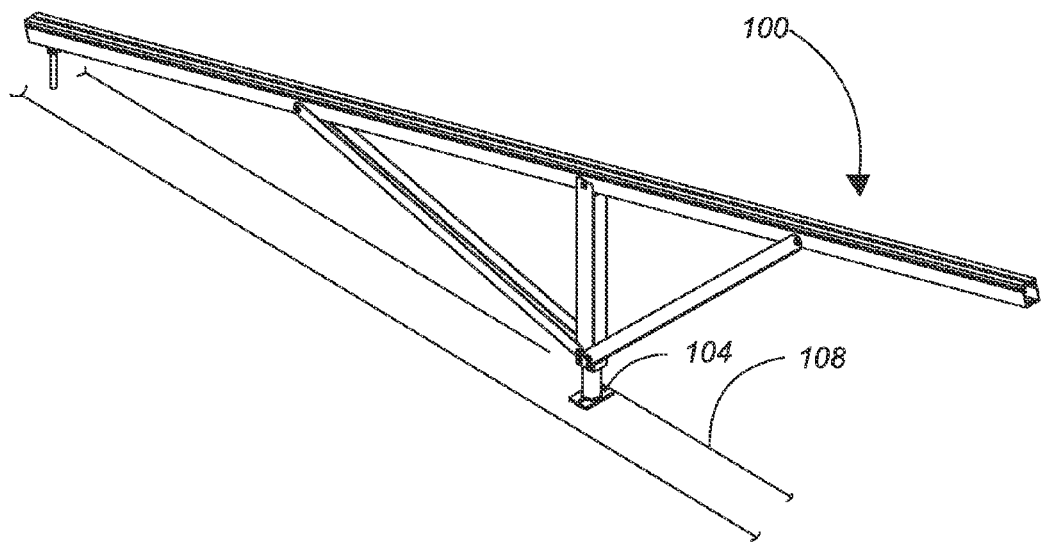
FIG. 2 shows a perspective view of said long span beam in the assembled position

| DRAWINGS-Reference Numerals | |
|---|---|
| 100 long span beam assembly | 101 top chord |
| 102 lower chord | 103 vertical member |
| 104 base support | 105 end support |
| 106 mounting pin | 107 locking bolt |
| 108 roof beam | 200 vertical member and base support |
| 203 vertical member | 205 base support |
| 206 mounting pin | 300 clamping base support |
| 301 beam clamp | 302 support post |
| 304 lifting bolt | 305 lifting bar |
| 306 roof beam flange | 307 reaction point of contact |
| 308 bearing pin | 309 roof |
| 310 roof beam | 311 purlin |
| 312 clamp lifting slot | 400 solar support cross-member |
| 401 T-slot | 402 T-slot retaining surface |
| 500 angle nut | 501 threaded hole |
| 502 tapered section | 503 nut flange |
| 504 nut slot | 600 beam and nut assembly |
| 601 nut shown in insertion position | 602 nut shown in rotation position |
| 603 nut shown in installed position | 700 two beam assembly |
| 701 upper beam | 702 retaining clip |
| 703 angle nut | 704 retaining screw |
| 800 solar array | 801 solar module |
| 802 long span beam assembly | 803 strut cross-member |

DETAILED DESCRIPTION

FIGS. 1 Through 8—Preferred Embodiments

The assembled unit, mounting method, and application of the central support beam are illustrated in FIGS. 1 through 12A. FIG. 1 shows the long span beam system 100 in the assembled, installed position. The tilt angle with respect to the ground is shown at 15 degrees, a typical angle associated with roof mounted solar arrays, however it can range widely depending on the latitude of the installation. The upper chord 101 provides the main mounting surface for the solar array and supports. The length of the upper chord can vary in accordance with the requirements for the solar array. In the preferred embodiment this length is in the range of 10 to 30 feet as a cost-effective range. The lower chords 102 when bolted in place provide the structural stiffness for the long span beam to withstand high wind loads along its full length. These lower chords can remain the same length independent of the desired tilt angle by positioning their connecting ends at the appropriate points along the upper chord. The vertical support 103 is positioned to accommodate the desired tilt angle. All connections are effected by pins, bolts, or bushings connecting through predrilled holes in the above mentioned members.

Attachment to the roof or other structures is effected with the mounting base 104 which is pinned or otherwise attached to the base of the vertical member 103. There are pins or fasteners connecting the mounting base to the vertical member to withstand loads on the long span beam due to due to wind, gravitational, or seismic forces. The bottom of the base support connects to roof structural members either at or below the roof line. One simple connection possibility consists of using one or more bolts or screws to fasten the base support flange against a roof beam 108. End stabilization is effected with the use of an end support 105 that connects the lower end of the long span upper chord to another point on the roof. The load on this end support is relatively low, because of the central position of the vertical member.

Figure 3:
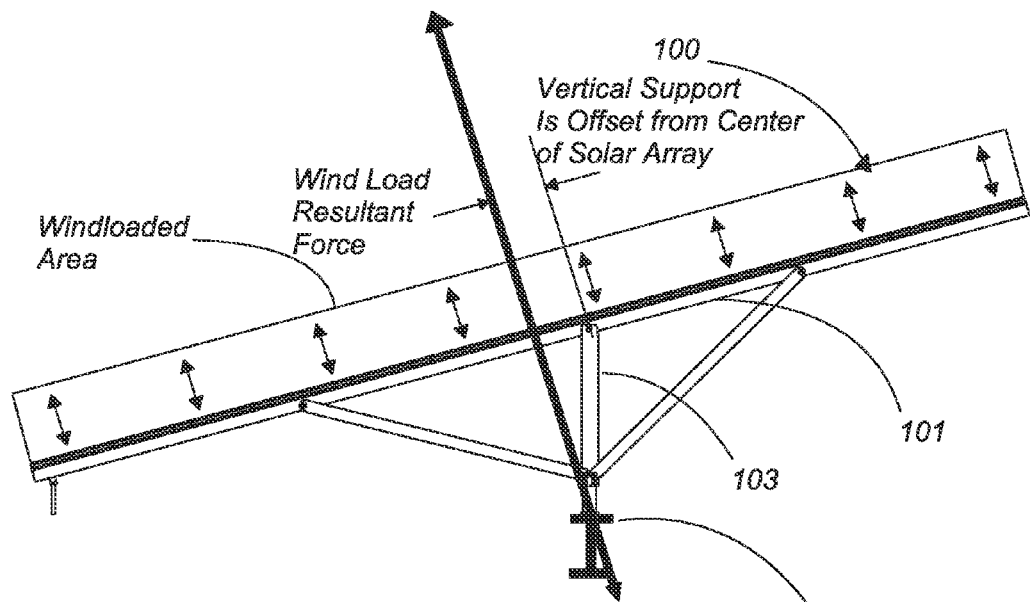
FIG. 3 shows a view of said long span beam at an angle with force vectors
Figure 3A:
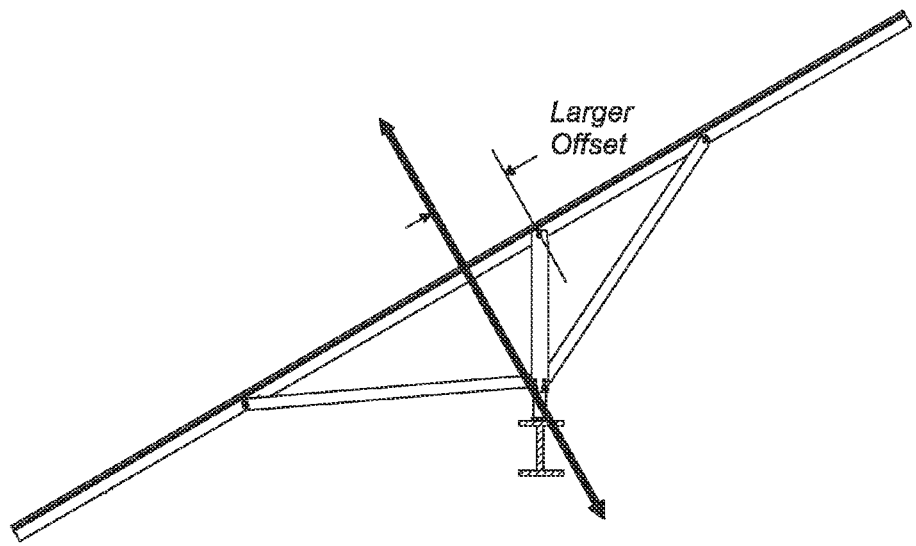
FIG. 3A shows a view of said long span in a steeper angle with force vectors
Figure 4:
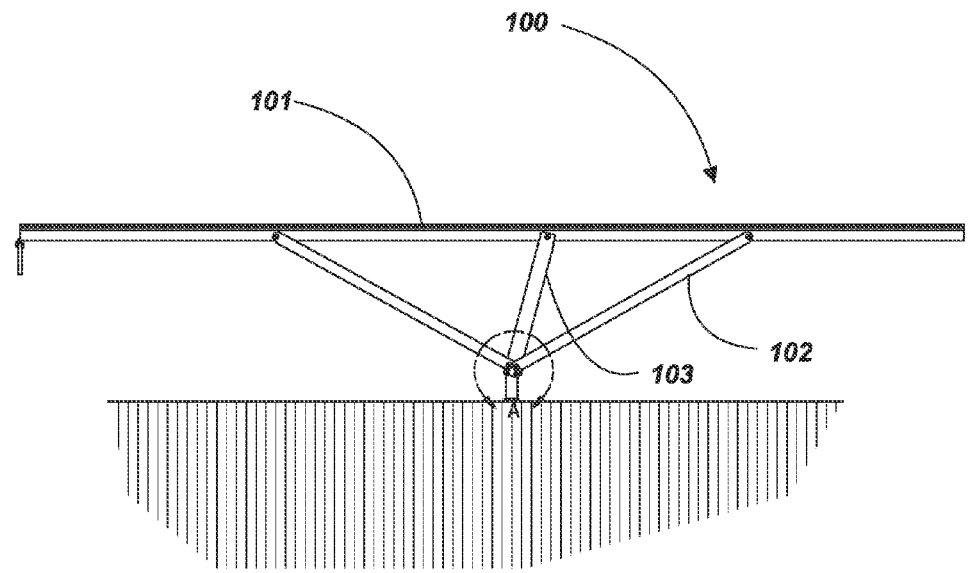
FIG. 4 shows a view of said long span beam in the servicing position
Figure 4A:
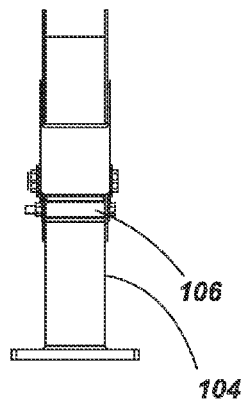
FIG. 4A shows a left elevation view of a beam base support in the service position
Figure 4B:
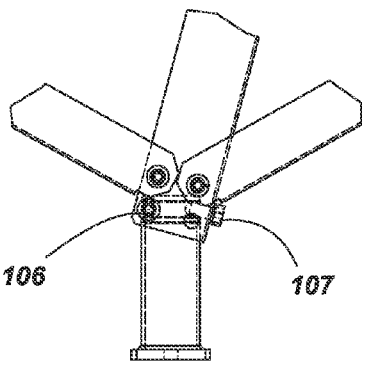
FIG. 4B shows a front elevation view of said beam base support in the service position
Figure 4C:
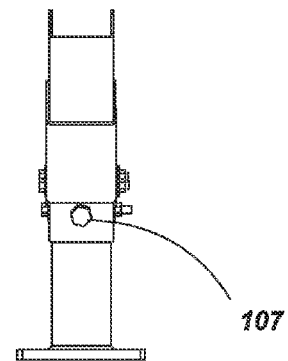
FIG. 4C shows a right elevation view of said beam base support in the service position

One of the most important aspects of the preferred embodiment is that connecting position the point of connection of the vertical member 103 to the upper chord 101. The vertical member 103 is offset from the beam center so that the resultant force due to wind loading, the potentially highest load factor, is directed through the base support and connecting roof beam 108. This offsetting of the vertical member from the center of the solar array eliminates most of the bending moment that is normally applied to long span base support and roof beam below it. The reason for this is that the calculated wind load or lift on the solar array is at a 90 degree angle or normal to the face of the solar array. Thus the wind load, the resultant of which passes through the center of the array, is in this case tilted at an angle of 15 degrees from vertical. By offsetting the vertical support this resultant load vector passes directly into the roof beam thereby substantially eliminating the twisting load that would otherwise be applied to said roof beam. This is particularly important for steel roof beams which are typically wide flange beams that are inherently weak in twisting or torsion. An additional benefit of the invention that is shown in FIG. 3A is that we without significantly changing the mounting positions of the lower chords to the top chord, as the tilt angle is increased it creates a larger offset of the vertical member that tends to redirect the resultant load to the desired position to minimize twisting. This self-centering geometric relationship is an important characteristic of the preferred embodiment.

During installation of a solar array it is convenient to have the long span beam positioned in a horizontal position or parallel to the roof for flat roof configurations. This prevents the solar panels from sliding down the beams as may happen if the top chord 101 is already at its tilted position. A tilted beam also makes it difficult to mount the solar panels at the upper end of said beam because it typically puts the panel at head height or higher for long beams. This long span system allows the array to be easily tilted to a horizontal position to simplify assembly. One of the methods for accomplishing this is shown in FIGS. 4, 4A, 4B, and 4C. Initially only one of the two mounting pins 106 is installed for support of the central mounting structure. The vertical member 103 of the central support structure is shown tilted at an angle that allows the top chord 101 to be initially positioned horizontally. A locking bolt 107 is used to anchor the long span beam in the horizontal position as shown. Once the solar array is attached to the central support beam the locking bolt 107 is retracted and the solar array section is rotated to its final position as shown in FIG. 1. At this point the second mounting pin 106 is connected in place to complete securing the array in its final operating position.

In addition to using this process for initial installation of the solar array, this same basic process can be used to tilt the array to the horizontal position for roof repair or reroofing. After the roof work is done the array can be tilted back into position as described above.

In the preferred embodiment the long span beam assembly is used for attachment to roof beams that are located adjacent and just below the roof structure. The post assembly is attached to the roof support beam 108 with one or more bolts through mounting base 107 as needed to assure stable support. This mounting method applies to concrete roofs as well as beam supported roofs. The post or shaft of the base support 104 is round in shape to allow conventional roof seals to be used to make the roof connection waterproof. Other shapes of shafts are possible including square or rectangular profiles which would typically require a roof layup style of seal.

In the preferred embodiment as shown in FIG. 5A of this invention the base support 205 facilitates rotation of the array that is mounted to it. This is accomplished with a circular groove at the top of the as shown is FIG. 5C. This circular groove allows rotation of the vertical member 203 with respect to the base support 205 and attached array as shown in FIG. 5B. The attachment pins 206 firmly hold the vertical member in place on the base support while still allowing the vertical member to rotate about the axis of the base support. This provides the flexibility to make final adjustments to align adjacent array sections after the full system is completely assembled.

Figure 6:
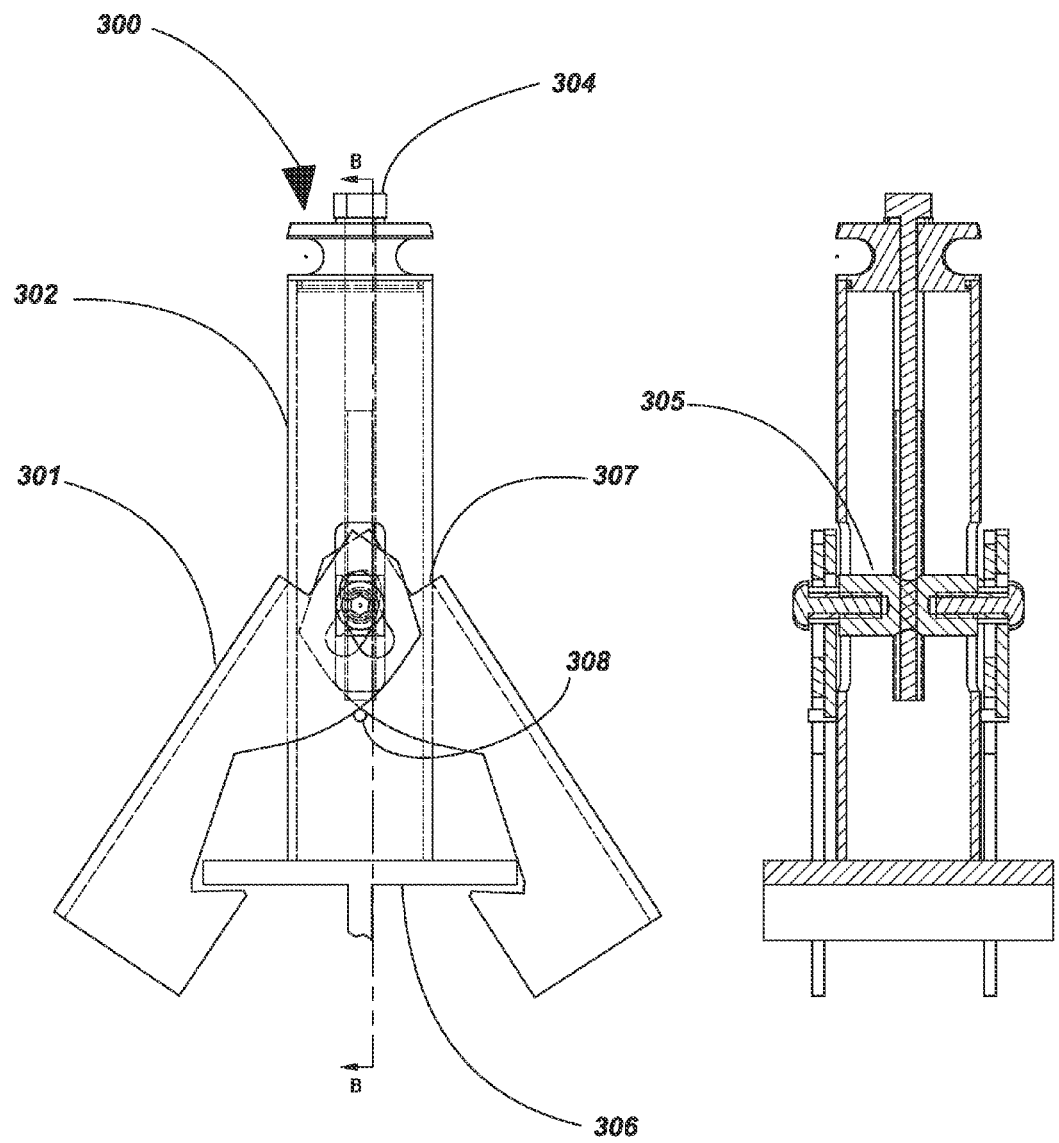
FIG. 6 shows a front and side view of a beam clamp assembly in the clamped position
Figure 7:
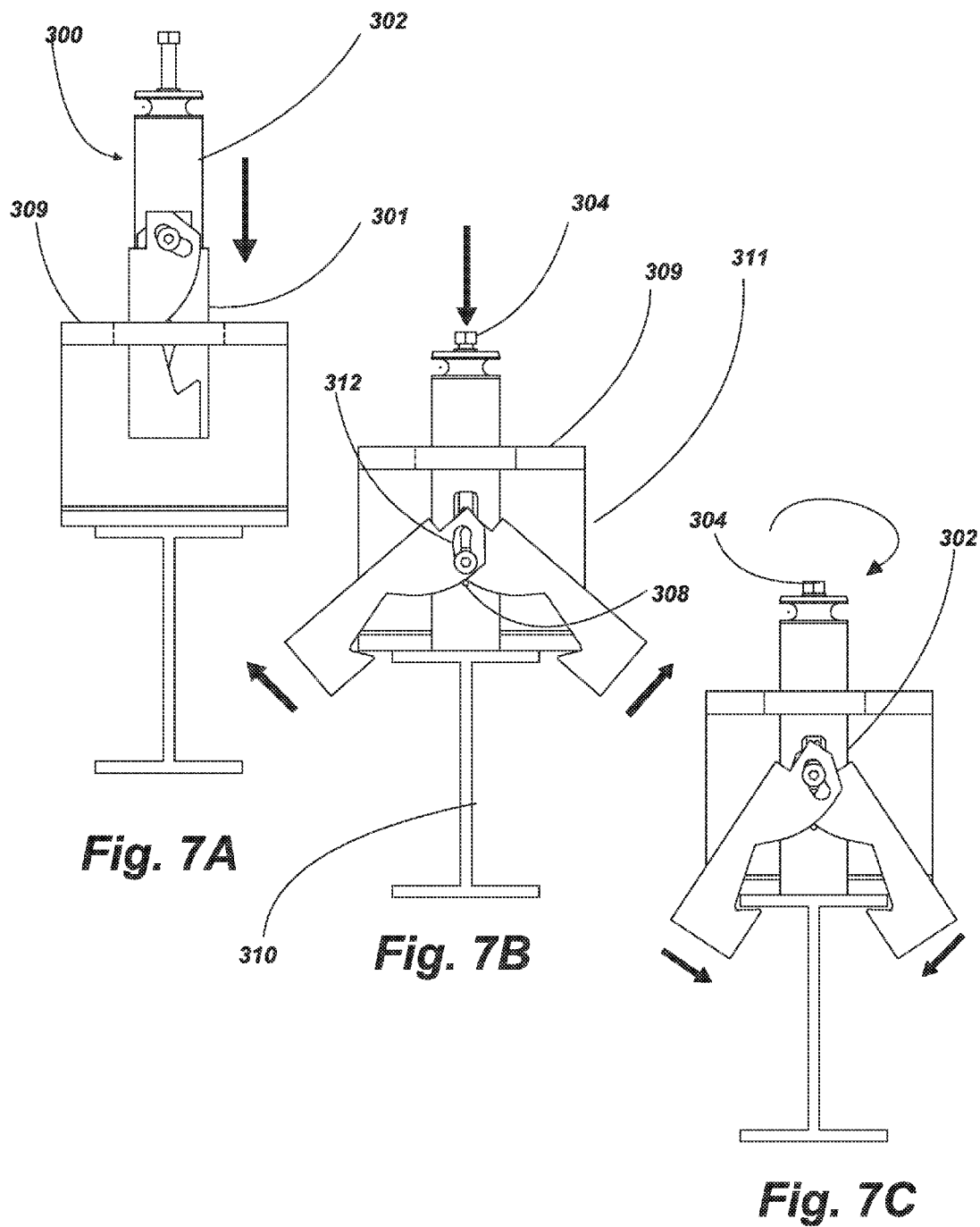
FIG. 7A shows a view of said beam clamp assembly in the folded position
FIG. 7B shows a view of said beam clamp assembly in the open position
FIG. 7C shows a view of said beam clamp assembly in the clamped position

The major roof beams of constructed steel buildings typically are located 8 to 12 inches below the roof line to allow room for the roof supporting purlins. In the preferred embodiment of this invention the base support for type of application utilizes a beam clamping method that can extend through the roof and securely attach to said roof beam. The clamping base support 300 shown in FIG. 6 provides a mounting solution for attaching to these steel beams below the roof line without the need to be inside the building. The clamping base support employs beam clamps 301 on opposing sides of the wide flange beam that clamp to the roof beam's upper flange 306 to secure the solar array to said beam. As the beam clamps are raised by the lifting bolt 304 and lifting bar 305 it causes the clamp jaws to tighten under the flange to securely fasten the base support to the beam.

Normally when a concentrated load is applied to the edges of a wide flange beam it generally creates an excessive bending moment on the flange that can cause failure of the beam. In the preferred embodiment of this clamping base support the stresses on the wide flange beam are minimized. As the base support clamps are tightened creating a lifting force on the flange the reaction force of the support post 302 applies a compression or downward force on this same flange in close proximity. This compression-tension coupling force causes the post, clamps and beam flange to structurally combine to create a much stiffer and stronger structure than the flange by itself. Thus when a lifting force or twisting moment is applied the flange along with the clamping components can withstand much higher loads than can be tolerated by a straight lifting force on the flange without the reacting force of the base support shaft.

This tension-compression coupling preload also limits the load cycling impact and resultant fatigue thereby extending the life of the clamping base support and wide flange beam. The tension-compression coupling also assures secure mounting of the post assembly and related solar array with less possibility of slippage over time.

The friction created by the clamp jaws preloaded against the underside of the beam flange is generally sufficient to prevent these same jaws from slipping away from the flange. However in order to assure a positive connection that will not slip away from the beam over time, the beam clamps 301 have an additional reaction point of contact. In the preferred embodiment the clamp lifting slot 312 shown in FIG. 7B is shaped into a radius that causes the clamp web to come in contact with the support post as the clamp jaws are tightened against upper flange 306. This reaction point of contact 307— the clamp web against the wall surface of the post 302—as force is applied to the lifting slot 312 creates a moment about the lifting pin axis that causes the clamp jaw to be forced or locked against the beam flange and against the post 302 simultaneously. This locking force thus prevents the clamp jaws from slipping away from the flange even if for some reason the clamping bolt were to loosen.

In the preferred embodiment the clamping base support is mounted to the roof beam beams 310 below the purlin 311 without having to go inside the building. FIGS. 7A through 7C show the sequence of installation. In FIG. 7A the clamping base support 300 is shown in the closed or folded state which allows it to be inserted through a relatively small hole that is cut through the roof 309. Deployment of the clamping base support is fully implemented through this hole without the need to approach the ceiling from the inside of the building. As shown in FIG. 7B, once inserted through the hole the clamp jaws are spread out by means of pushing down on the lifting bolt 304 causing the radiused section of the beam clamps 301 to push against a bearing pin 308 mounted in the post that forces the jaws outward as the lifting bolt is pushed down. As the jaws move outward it allows the support post 302 to make contact with the top of the wide flange beam, then the lifting bolt is released allowing the clamp jaws 301 to close onto the beam. In FIG. 7C the lifting bolt 304 is then tightened which causes the clamp the jaws to tighten securely onto the top of the beam 310 and against the surface of the post 302 as described above.

FIG. 8 shows a segment of a typical solar support cross-member 400 that mounts on top of the long span upper chord 101. This strut utilizes a T-slot 401 for retention of fastening devices for attachment of solar components. The key slot retaining surface 402 is used to retain a nut 500 shown in FIG. 9 to which solar panels are attached. The nut 500 has a threaded hole 501 for bolting solar panels and other components to said nut. When a fastening bolt is tightened into the threaded hole, it lifts the nut so that the nut flange 503 comes into contact with the strut retaining surface 402. FIG. 10 shows the nut installation sequence 600 into the T-slot of a typical solar support cross-member. Orientation 601 shows the position upon initial installation. Position 602 shows the nut position as it is in the process of being rotated to its retaining position, and position 603 shows the nut in its final retaining position in the T-slot. This nut, which is cut in a diagonal shape, easily rotates to the locked position shown in FIG. 10 with little or no torque required. The profile of the nut shown in FIG. 9 shows a tapered section 502 at the base of the nut's raised section. Once the nut is rotated clockwise into its retaining position 603 and tightened against the strut retaining surface 402 as shown in FIG. 10A, the tapered section will not allow the nut to rotate counterclockwise out of position because the tapered section is pulled into the narrower T-slot area. Unlike standard quarter turn fasteners this assures the user that accidental rotation and loosening of the nut will not happen even in the instance of intense vibration. A slot 504 in the nut provides the function of rotating the nut into position before attachment of mating components and also provides verification that the nut is in the correct position.

Figure 11:
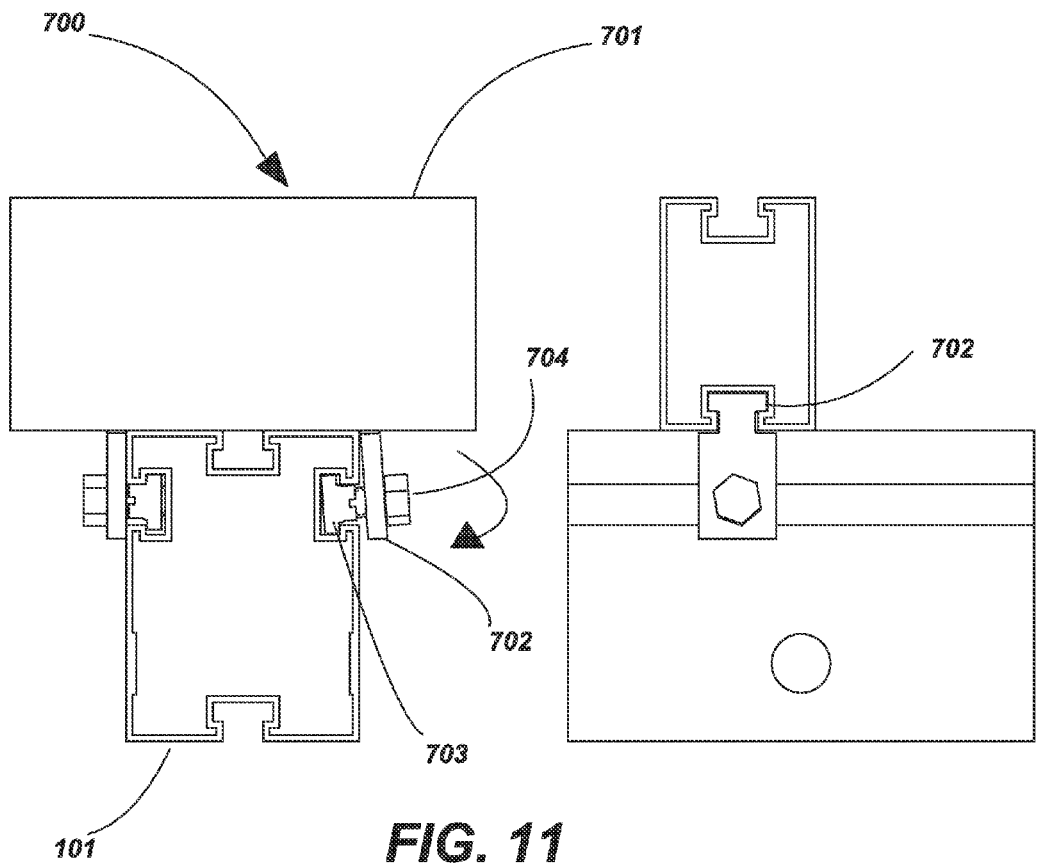
FIG. 11 shows a view of two beams, retaining nuts and retaining clips in an assembly process
Figure 11A:
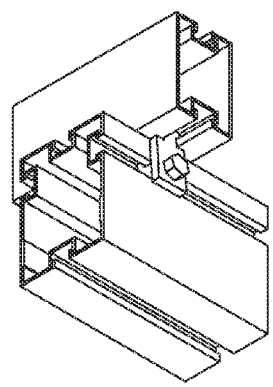
FIG. 11A shows a perspective view of said beams, retaining nuts and retaining clips in an assembly process

FIG. 11 illustrates a preferred embodiment for joining a strut cross-member to the long span upper chord 101. This is a typical assembly detail 700 showing the attachment of a strut cross-member 701 over a top chord 101. In order to assure a completely tight assembly the retaining clip 702 is made intentionally short. On the right side is the connection of said retaining clip 702 and nut 703 using a standard hex head cap screw 704. First the retaining clip 702 is pre-assembled to the nut 703 with the cap screw. Then the retaining clip ears are inserted into the T-slot in the upper strut. The preassembly is then swung into position so that the lower part which includes the nut is inserted at a slight angle into the lower T-slot as shown in FIG. 11 on the right side. This intentional shortness of the retention clip and nut assembly assures the installer that once this assembly is fully tightened it will create a tight, interference fit that prevents the joint from slipping due to outside forces such as wind load. On the left side of FIG. 11 the screw 704 is shown fully tightened and clearly shows the interference fit. FIG. 11A shows a perspective view of the assembly.

Figure 12:
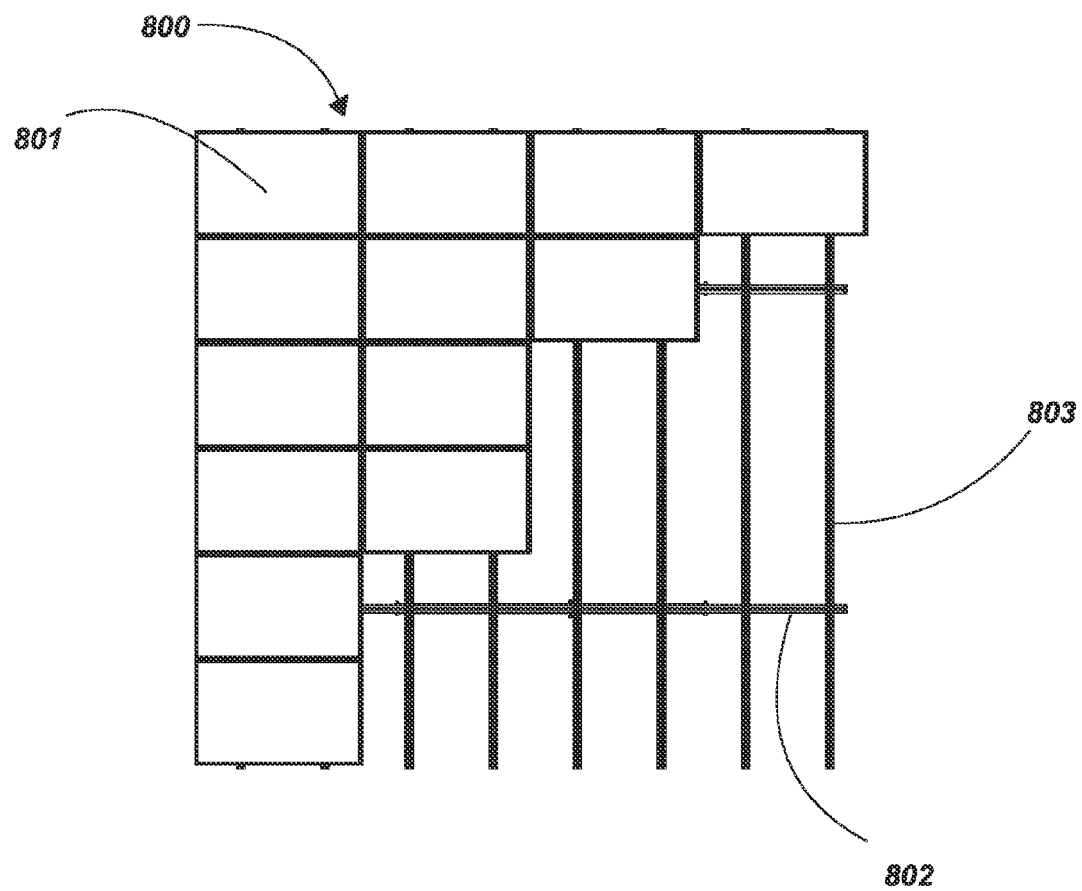
FIG. 12 shows a top view of a solar array mounted on two long span beams
Figure 12A:
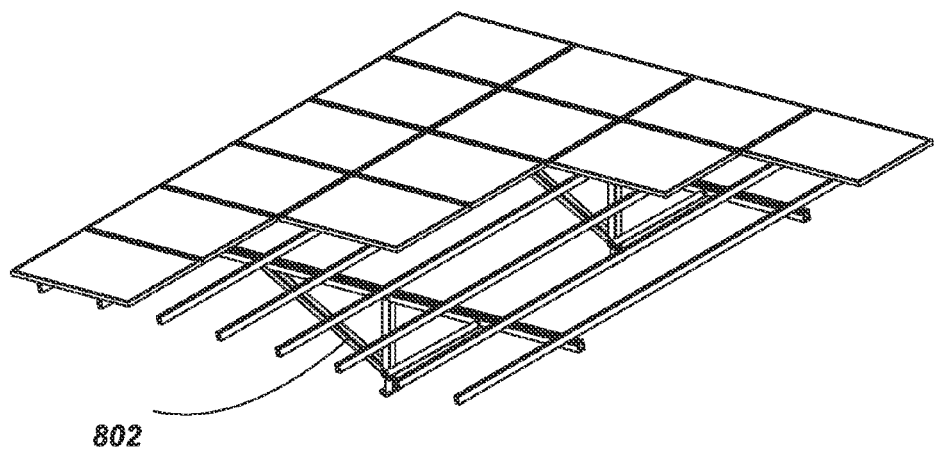
FIG. 12A shows a perspective view of a solar array mounted on said two long span beams

FIGS. 12 and 12A show a top view and perspective view respectively of a typical solar panel array 800 on a roof structure incorporating a number of panels 801 that are mounted on strut cross-members 803. The strut cross-members are shown mounted on top of the long span beam assemblies 101.

Thus the reader will see that the support beam provides a highly reliable, labor saving, yet economical device that has a wide range of usage. While the above description contains many specificities these should not be construed as limitations on the scope of the invention, but rather as exemplifications of some of the preferred embodiments thereof. Many other variations and embodiments are possible.

Accordingly, the scope of the invention should be determined not by the embodiments illustrated, but by the appended claims and their legal equivalents.

I claim:

1. An apparatus comprising a long span beam assembly consisting of:
    a top chord having a first end and a second end;
    one base support adapted for attachment to a roof beam, comprising:
        a support post having a first end and a second end;
        a lifting bar slidably engaging apertures formed in said support post and adjustably positionable between said first and second ends of said support post;
        a lifting bolt passing through an aperture formed in said first end of said support post and threadably engaged to said lifting bar; and
        a pair of opposing beam clamps pivotally connected to opposite ends of said lifting bar and adapted for gripping opposite sides of the roof beam;
    one vertical member having a first end attached to said top chord and a second end rotatably and tiltably connected to said base support;
    a first lower chord having a first end attached to said second end of said vertical member and a second end attached to said top chord between said first end of said vertical member and said second end of said top chord;
    a second lower chord having a first end attached to said second end of said vertical member and a second end attached to said top chord between said first end of said vertical member and said first end of said top chord; and
    a removable mounting pin passing through apertures formed in said vertical member and said base support,
    wherein said first end of said vertical member is closer to said second end of said top chord than to said first end of said top chord,
    said top chord, said vertical member, and said first and second lower chords form a rigid structure tiltable and rotatable relative to said base support, and
    said pair of opposing beam clamps are displaced toward said first end of said base assembly by rotation of said lifting bolt, thereby gripping said roof beam,
    whereby offsetting said vertical member from a center position of said top chord directs a wind load resultant force on said apparatus through said base support and a bending load on the roof beam is reduced.

* * * * *